Aug. 11, 1970    G. TRAUGOTT    3,523,469
TOOL CARRIAGE WITH TURRET

Filed Jan. 17, 1968    3 Sheets-Sheet 3

INVENTOR
GERT TRAUGOTT
BY

United States Patent Office 3,523,469
Patented Aug. 11, 1970

3,523,469
TOOL CARRIAGE WITH TURRET
Gert Traugott, Buderich, Germany, assignor to Schiess Aktiengesellschaft, Dusseldorf-Oberkassel, Germany
Filed Jan. 17, 1968, Ser. No. 698,539
Claims priority, application Germany, Jan. 20, 1967, Sch 40,118
Int. Cl. B23b 39/20
U.S. Cl. 77—4
5 Claims

ABSTRACT OF THE DISCLOSURE

A machine tool carriage with turret pivotable about an axis at least approximately perpendicular with regard to the direction of displacement of said carriage and with a drive shaft extending in the direction of displacement of said carriage and selectively connectable with and disconnectable from a boring drill receiving sleeve in said turret.

The present invention relates to a tool carriage which is movable toward and away from the work piece and has its free end equipped with a turret the pivot axis of which is perpendicular or approximately perpendicular to the direction of displacement of the tool carriage.

Tool carriages of this type are known which are displaceable on the vertical column of a vertical turret lathe or, in case of a two-column lathe, are displaceable vertically in a support which in its turn is horizontally displaceable on the transverse beam of a lathe. By means of the tools of the turret, numerous different turning operations can be carried out on the work piece clamped to the turning table while the various tools in the turret become successively employed.

With machines of this type there exists the need, if desired, in one single clamped position of the work piece also to be able to carry out boring operations in the work piece. To this end it is known to mount a driven rotatable shaft in the tool carriage and to connect to said shaft a boring tool after the turret has been removed from the tool carriage so that the boring tool takes the place of the tools of the turret.

This exchange of tools requires considerable time and eliminates the possibility of carrying out boring operations by means of the tools in the turret directly following the machining operations or between such machining operations. In particular, the possibility is lacking, for instance by means of a numerical control, successively to employ tools of the turret as well as the boring tool because the tool exchange requires an interruption of the machine operations. Moreover, as a rule it is not possible with heretofore known arrangements of the type involved to use the displacement of the tool carriage also as feeding movement for the boring tool.

It is, therefore, an object of the present invention to provide a tool carriage of the above mentioned type by means of which a boring tool can be used without prior thereto removing the turret.

It is another object of this invention to provide a tool carriage as set forth in the preceding paragraph, which will permit an automatic control of the tool carriage and the turret to make possible the immediate employment of the boring tool and its feeding operation.

These and other objects and advantages of the invention will appear more clearly from the following specification in connection with the accompanying drawings, in which.

The present invention is characterized primarily in that the turret is equipped with a freely rotatably journalled boring sleeve extending in spaced relationship to the pivot axis in the direction of displacement of the tool carriage. A boring tool is insertable into one end of said boring sleeve whereas the other end of said boring sleeve, in the pivoted position of the turret associated therewith, is adapted to be coupled to a drive shaft which is axially displaceable in the direction of displacement of the tool carriage.

Such an arrangement brings about that the turret will be able to receive not only the turning tools for the respective turning operations but also at the same time will be able to receive the boring tool and to be pivotable therewith so that the boring tool can be used in a certain position of the turret by directly coupling said boring tool to a drive shaft while the feeding movement of said boring tool is effected by a corresponding advancement of the tool carriage.

The boring sleeve may additionally be freely rotatably journalled on the turret outside the pivot axis thereof in a corresponding bearing housing flanged to the turret. However, it is more favorable, according to the present invention, to mount the boring drill directly in the turret so that it extends therethrough. This brings about the advantage that in case of a square turret, which is adapted to receive eight tools, it is merely necessary to forego the employment of two oppositely located tools the place of which is taken by the boring sleeve extending through the turret.

According to a further development of the present invention, the tool carriage may in spaced relationship to the turret carry a gear box in which the drive shaft adapted to be driven by the gears or transmission is axially displaceably journalled. The distance of the gear box from the turret is to be so selected that the turret will be able freely to pivot with its tools and the boring tool inserted in the boring sleeve without being interfered with by the gear box. The distance between the gear box and the turret is, for purposes of coupling the boring sleeve to the drive shaft, bridged by the latter so that the drive shaft is axially displaceable for the coupling operation which means is movable out of the gear box.

According to a further feature of the invention, the drive shaft may be provided with a profile extending over the length of the drive shaft so as to be adapted by means of said profile to have that end thereof which faces the turret movable into and out of engagement with a corresponding inner profile of the boring sleeve. The said profile of the drive shaft is adapted axially displaceably to extend through a sliding sleeve drivably journalled in the gear box.

Figure 1:
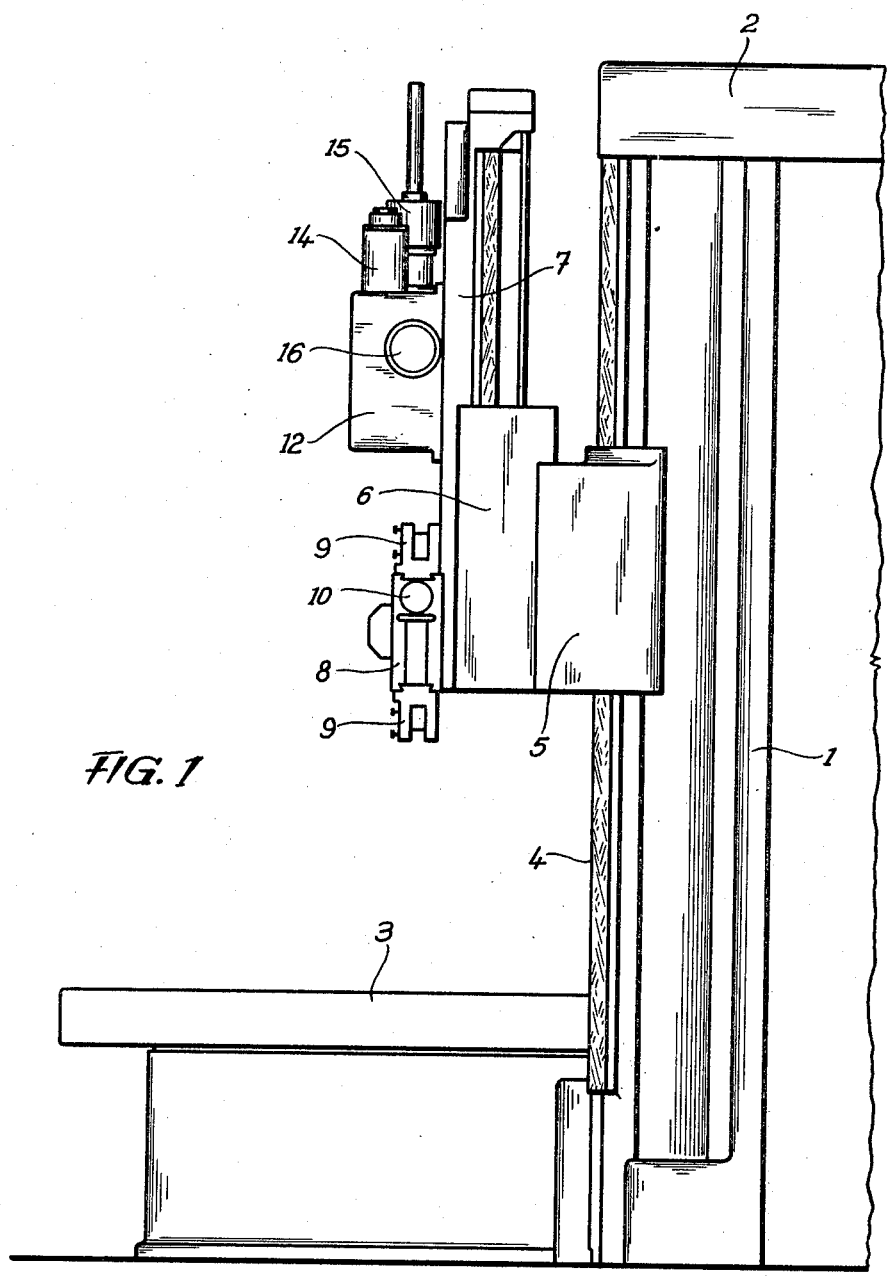
FIG. 1 is a partial side view of a two-column vertical turret lathe.

Referring now to the drawings in detail, FIG. 1 indicates how a tool carriage according to the invention may be employed. FIG. 1 shows one machine column 1 which covers up the second machine column so that the latter is not visible in FIG. 1. Both machine columns are interconnected by the head beam 2. Between the two columns 1 there is provided a turning table 3. The vertical guiding means 4 of the columns 1 carry a transverse beam 5 for upward and downward movement, said beam 5 carrying a transverse displaceable support 6 which in its turn supports the vertically displaceable tool carriage 7. The tool carriage 7 has its lower end equipped with a detachably mounted turret 8 which is shown in view in FIG. 3.

Figure 2:
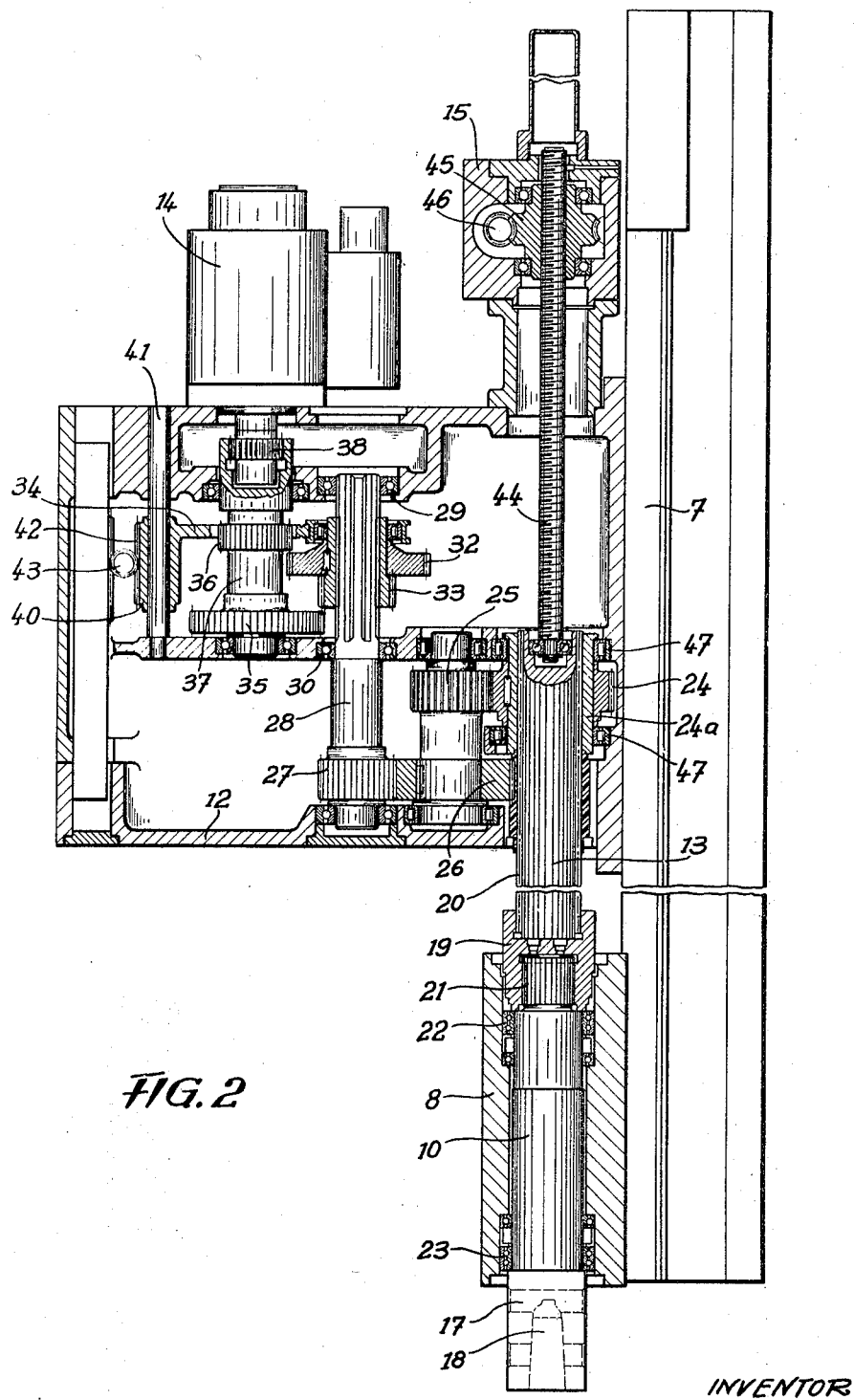
FIG. 2 illustrates in section on a somewhat larger scale than FIG. 1 the tool carriage with gear box and turret.
Figure 3:
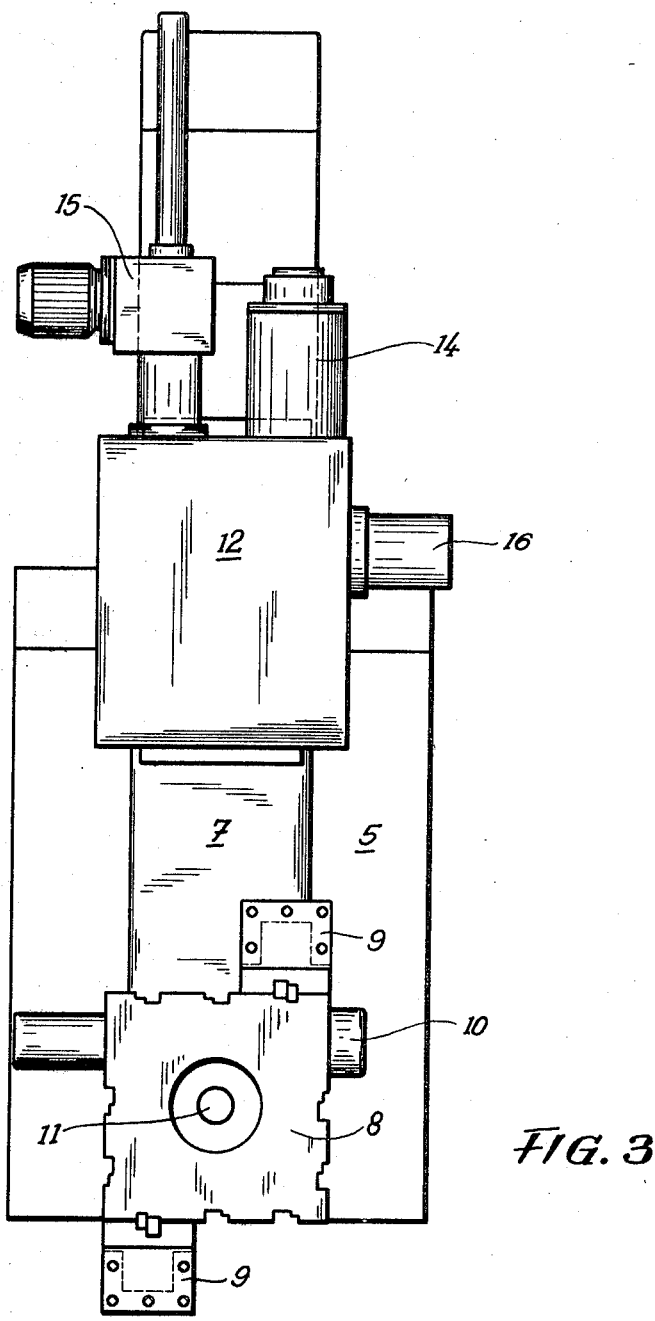
FIG. 3 illustrates on a somewhat smaller scale than FIG. 2 a view of the tool carriage with gear box and turret.

As will also be seen from FIG. 3, the turret 8 is a square turret adapted to receive and support six tool holders 9, two of which are shown. On two oppositely located sides of the turret 8, two additional tool holders 9 may be mounted. However, in place of these two additional tool holders, in contrast to heretofore known turrets of the type involved, a boring sleeve 10 may be provided according to the invention which extends through said turret. The tool carriage 7 carries a gear box generally designated 12 which is spaced from the turret 8 at such a distance as to permit a free pivoting movement of the turret 8 with its tools about the pivot axis 11. As will be seen in particular from FIG. 2, a drive shaft 13 is displaceable in said gear box 12 for axial movement in the longitudinal direction of the tool carriage 7. A drive motor 14 for the drive shaft 18 is mounted on the gear box 12. FIG. 1 furthermore shows an an additional housing 15 which houses the control mechanism for moving the drive shaft 13 in and out in conformity with FIG. 2. Laterally of the gear box 12 there is flanged thereto a motor 16 by means of which through control elements of any standard design it is possible to control the speed of the drive shaft 13.

According to FIGS. 1 and 3, the turret 8 occupies a position in which the boring sleeve 10 is in a horizontal position. By pivoting the turret 8 about its axis 11 in counterclockwise direction by 90°, the boring sleeve 10 moves into its vertical position of use according to FIG. 2. In a manner known per se, a boring tool can be clamped into the boring sleeve 10. To this end, the boring sleeve 10 may have its free end 17 provided with a conical bore 18 into which the boring tool is inserted and locked by transverse keys.

Assuming with regard to FIG. 3 that according to FIG. 2 the boring sleeve 10 occupies its position of use, the drive shaft 13 is vertically moved out of the gear box 12 until its free end engages the coupling end 19 of the boring sleeve 10. The coupling end 19 is a coupling sleeve the other end of which is slipped by means of the splined portion 21 upon the partially solid boring sleeve 10. In the particular embodiment shown, the boring sleeve 10 is hollow only at the free end where the conical bore 18 is provided. Sleeve 10 is freely rotatably journalled in turret 8 by means of antifriction bearings 22 and 23.

As will be seen from FIG. 2, the drive shaft 13 which is provided with outer teeth 20 throughout its entire length, extends through a sliding sleeve 24 provided with corresponding inner teeth and journalled in the gear box 12 by means of antifriction bearings 47. Mounted on the sliding sleeve 24a is a pinion 24 meshing with the driving pinion 25 which in its turn through the intervention of gear 26 is driven by a pinion 27 keyed to shaft 28 which latter is journalled in three bearings in the gear box 12. The shaft 28 is between the bearings 29 and 30 designed as splined shaft on which the pinions 32 and 33 are together longitudinally displaceable by means of the coupling jaw 34 in order either to engage the pinion 33 with the pinion 35 or to engage the pinion 32 with the pinion 36 on shaft 37. Shaft 37 is directly coupled to the output shaft 38 of the motor 14. The coupling jaw 34 is supported by the sliding sleeve 40 on bar 41. Sleeve 40 carries a rack 42 which meshes with a pinion 43 adapted to be driven by motor 16. The said transmission train drives the pinion 26 which in its turn through the pinions 25 and 24 rotates the sliding sleeve 24a and thereby the drive shaft 13. The drive shaft 13 is adapted by means of the threaded spindle 44 to be moved into the gear box 12. The spindle 44 extends to this end through a worm wheel 45 which forms a spindle nut and which is adapted to be driven by means of worm 46 and motor M. By means of the spindle 44, due to the rotation of the worm wheel 45 in one direction—said worm wheel 45 similar to worm 46 being journalled in housing 15—the drive shaft 13 is moved into the gear box in which instance the drive shaft 13 disengages the coupling sleeve 19 of the boring sleeve 10. When the spindle 44 rotates in the opposite direction, the drive shaft 13 is moved toward the turret 8 until it engages the coupling sleeve 19 of the boring sleeve 10 and thereby establishes a coupling connection. The lower end of the spindle 44 is freely rotatably connected to the drive shaft 13 which may be designed as a hollow shaft so that the turning movement of the drive shaft 13 is independent of the turning movement of the spindle 44.

As will be evident from the drawings, it is possible by means of the turret 8 to employ a maximum of six tools if each tool holder 9 carries one tool. These six tools may be employed successively in connection with the machining of a work piece. In addition thereto or therebetween it is also possible to carry out working operations by pivoting the turret 8 into such a position that the boring sleeve 10 has is free end 7 directed vertically downwardly, i.e. against the work piece. The boring sleeve 10 is thus together with the boring tool (not shown) put into rotation due to the fact that the drive shaft 13 is moved out of the gear box 12 and coupled to the coupling sleeve 19 of the boring sleeve 10.

After the boring operation has been completed, the drive shaft 13 is returned into the gear box 12, and the turret 8 can be pivoted into another working position.

It will thus be evident that the present invention provides a tool carriage the turret of which is able also to carry out boring operations which heretofore were impossible due to the fact that the turret had to be exchanged for a drilling head and thus required assembly and disassembly operations.

It is, of course, to be understood that the present invention is, by no means, limited to the particular construction shown in the drawings but also comprises any modifications within the scope of the invention.

What I claim is:

1. In combination with a machine tool: a gear box with gear means and motor means for driving said gear means, an axially displaceable driving shaft rotatable by said motor means through the intervention of said gear means, a tool carriage movable on said machine tool in the axial direction of said axially displaceable driving shaft, a turret pivotally supported by said tool carriage so as to be pivotable about an axis perpendicular to the direction of movement of said carriage, and sleeve means arranged in axial alignment with said axially displaceable shaft and freely rotatably associated with said turret, one end portion of said sleeve means being adapted to receive a boring tool and the opposite end portion of said sleeve means being provided with means for selective driving connection with said axially displaceable driving shaft.

2. An arrangement according to claim 1, in which said sleeve means is rotatably mounted in said turret and extends therethrough.

3. An arrangement according to claim 1, in which said gear box is carried by said tool carriage in spaced relationship to said turret, and in which said driving shaft is axially displaceable in said gear box.

4. An arrangement according to claim 1, in which said opposite end portion of said sleeve means is provided with inner teeth means, and in which said driving shaft is over its length provided with outer teeth means adapted to engage said inner teeth means for selective coupling engagement therewith, said arrangement also including additional sleeve means rotatably journalled in said gear box and drivingly connectable to said motor means through said gear means in said gear box while axially displaceably engaging said outer teeth means of said driving shaft.

5. An arrangement according to claim 1, which includes: threaded spindle means having one end portion rotatably journalled in and connected to said driving shaft, a worm drive comprising a worm wheel having a threaded axial bore threadedly engaged by said threaded spindle means, and additional motor means drivingly connectable to said worm drive.

References Cited

UNITED STATES PATENTS

| 3,073,024 | 1/1963 | Hutchens et al. | 77—25 |
| 3,074,147 | 1/1963 | Miller et al. | 77—25 |
| 3,203,017 | 8/1965 | Holzl | 77—25 |

FOREIGN PATENTS 1,331,548   5/1962   France.

GERALD A. DOST, Primary Examiner

U.S. Cl. X.R.

77—1, 25; 82—2